United States Patent
Brenner et al.

(10) Patent No.: US 7,218,804 B2
(45) Date of Patent: May 15, 2007

(54) METHOD AND DEVICE FOR ESTABLISHING AN OPTICAL CONNECTION BETWEEN AN OPTOELECTRONIC COMPONENT AND AN OPTICAL WAVEGUIDE

(75) Inventors: Karl-Heinz Brenner, Mannheim (DE); Ulrich Brüning, Neustadt (DE)

(73) Assignee: Universität Mannheim, Mannheim (DE)

(*) Notice: Subject to any disclaimer, the term of this patent is extended or adjusted under 35 U.S.C. 154(b) by 0 days.

(21) Appl. No.: 11/198,936

(22) Filed: Aug. 8, 2005

(65) Prior Publication Data
US 2006/0029331 A1    Feb. 9, 2006

(30) Foreign Application Priority Data
Aug. 7, 2004  (DE)  ............. 10 2004 038 530

(51) Int. Cl.
G02B 6/12  (2006.01)
G02B 6/06  (2006.01)
G02B 6/04  (2006.01)
G02B 6/10  (2006.01)

(52) U.S. Cl. .................. 385/14; 385/129; 385/130; 385/131; 369/116; 369/121

(58) Field of Classification Search .................. 385/14
See application file for complete search history.

(56) References Cited

U.S. PATENT DOCUMENTS 5,168,537 A    12/1992  Rajasekharan et al.
5,764,832 A    6/1998   Tabuchi
5,968,305 A *  10/1999  Maenza ............... 156/272.8
6,389,202 B1   5/2002   Delpiano et al.
6,721,076 B2 * 4/2004   King et al. .............. 359/35

FOREIGN PATENT DOCUMENTS

DE  43 23 681     1/1995
JP  2003131088    5/2003

* cited by examiner

Primary Examiner—Frank G. Font
Assistant Examiner—Mary El-Shammaa
(74) Attorney, Agent, or Firm—Venable LLP; Robert Kinberg; Steven J. Schwarz

(57) ABSTRACT

A method for establishing an optical connection between at least one optoelectronic component arranged in a first substrate and emitting or receiving optical radiation substantially perpendicular to a substrate surface of the first substrate, and at least one optical waveguide aligned with a first end substantially parallel to the substrate surface. The method comprises providing a second substrate that is transparent for at least one wavelength range of the optical radiation, and applying a layer of material on the second substrate. The layer is transparent, at least after structuring, for the wavelength range. The method also comprises structuring the layer of material in such a manner that the structured material forms both a lateral guide for the first end of the optical waveguide and an optical deflection element establishing an optical connection through the second substrate between the optoelectronic component and the first end of the optical waveguide, and joining the second substrate to the first substrate.

23 Claims, 3 Drawing Sheets

METHOD AND DEVICE FOR ESTABLISHING AN OPTICAL CONNECTION BETWEEN AN OPTOELECTRONIC COMPONENT AND AN OPTICAL WAVEGUIDE

CROSS-REFERENCE TO RELATED APPLICATION

This application claims the priority of German Patent Application No. 10 2004 038 530.0 filed Aug. 7, 2004, the subject matter of which is incorporated herein by reference. The disclosure of all U.S. and foreign patents and patent applications mentioned below are also incorporated herein by reference.

BACKGROUND OF THE INVENTION

The present invention relates to a method and a device for establishing an optical connection between at least one optoelectronic component in a first substrate, which emits or receives optical radiation almost perpendicular to a substrate surface of the first substrate, and at least one optical waveguide, in particular an optical fiber, aligned with one first end almost parallel to the substrate surface.

Optical connection technology, as presently employed in long distance connections or in local area networks (LANs), is not optimally suited for signal connections inside computer systems. The hitherto available plug-type connections between the optical transmitters or receivers and the utilized optical waveguides, in particular optical fibers, are, on the one hand, too expensive for such type use, and on the other hand take up too much space.

Especially in the use of surface-emitting semiconductor lasers, so-called VCSELs (vertical cavity surface emitting laser), there is a need for space-saving, cost-effective methods and devices to connect these lasers to optical waveguides, in particular multimode glass fibers which are aligned with one end almost parallel to the surface of the semiconductor substrate in which the semiconductor laser is integrated. The beam deflection required for this purpose is usually realized by using glass fibers, whose ends are cut at an angle of 45° and polished. The fiber is then positioned exactly over the semiconductor laser by means of micropositioning in such a manner that the laser beam emitted into the glass fiber by the semiconductor can be deflected 90° by means of reflection at the polished end surface. The polishing process, however, is relatively complicated and time consuming. Furthermore, each single fiber has to be individually micropositioned and fixed over the respective semiconductor laser. These steps make the connecting process very expensive in production.

U.S. Pat. No. 6,389,202 B1 describes a method and a device for optical coupling of optoelectronic components with optical fibers, in which the time and effort involved in positioning is reduced. For this purpose, a defined trough is placed in a carrier substrate by means of plasma ion etching to guide the fiber. In this case, too, beam deflection occurs by slanting the end surface of the fiber at an angle of 45°. The semiconductor substrate with the optoelectronic component is then placed on the carrier substrate.

U.S. Pat. No. 5,168,537 describes a device for optical connection between a multiplicity of light conducting fibers and optoelectronic elements, in which one or a multiplicity of prisms is/are disposed inside a plug housing for the fiber ends for beam deflection. However, there is no information provided in this printed publication about the production of the device, in particular, about how the prisms are built in.

U.S. Pat. No. 5,764,832 A describes another technology for establishing an optical connection between an integrated optoelectronic semiconductor element and an optic fiber. In this technology, a trough, which serves to receive and guide the fiber, is etched into a silicon substrate in an anisotropic etching step. Due to the orientation of the crystal planes of the silicon, this etching step produces an end surface with a gradient of approximately 54°, which acts as a reflection surface for deflecting the optical beam into an optoelectronic semiconductor component or from an optoelectronic semiconductor, which is placed on the substrate. However, due to the crystal structure of the silicon and the angle of the end surface related thereto, this technology does not permit 90° deflection.

SUMMARY OF THE INVENTION

Based on this prior art, an object of the present invention is to provide a method and a device for establishing an optical connection between an optoelectronic component that emits or receives perpendicular to the surface and an optical waveguide aligned parallel to the surface permitting both cost-effective production of the connection as well as 90° deflection.

According to one exemplary embodiment, the present invention provides a method for establishing an optical connection between at least one optoelectronic component arranged in a first substrate and emitting or receiving optical radiation substantially perpendicular to a substrate surface of the first substrate, and at least one optical waveguide aligned with a first end substantially parallel to the substrate surface, said method comprising: providing a second substrate that is transparent for at least one wavelength range of the optical radiation; applying a layer of material on said second substrate, said layer being transparent, at least after structuring, for said wavelength range; structuring said layer of material in such a manner that the structured material forms both a lateral guide for the first end of the optical waveguide and an optical deflection element establishing an optical connection through the second substrate between the optoelectronic component and the first end of the optical waveguide; and joining the second substrate to the first substrate.

According to one aspect of the present method, structuring occurs in such a manner that the structured layer forms both a lateral guide for the first end of the optical waveguide as well as an optical deflection element for establishing the optical connection between the optoelectronic component and the first end of the optical waveguide completely through the second substrate. For this purpose, the second substrate is suitably positioned over the first substrate and joined therewith.

The optical transparency of the structured material or layer and the second substrate required by the present method and the device therefor is only needed for that wavelength range in which the optical transmission between the optoelectronic component and the optical waveguide, usually an optical fiber, should occur. The present method permits cost-effective production of this type of an optical connection. The single connection does not require more space than the diameter of the utilized optical waveguide, permitting in this manner realization of a great number of connections in a very confined space.

The present method offers special advantages if a multiplicity of optoelectronic components is to be connected simultaneously with optical waveguides, in particular optical fibers. The present method utilizes the provision of a large number of optoelectronic transmitters and/or receivers on a common first substrate, in particular a wafer, as is usually the case in producing such optoelectronic components. As the second substrate on which the layer of transparent, to-be-structured material is applied, a substrate is used that matches in size to the first substrate. Structuring occurs according to the raster of the optoelectronic components on the first substrate. Then the two substrates are joined according to the present method thereby forming a composite. Subsequently the substrate composite is divided into single units. For this, only a single micropositioning step of the two substrates to each other is required. The precision of the bonding is primarily determined by the precision of the structuring process. If a photoresist is preferably employed as the transparent material and this photoresist is structured photolithographically, the same photolithographic precision can be ensured for all the connections to the optoelectronic components, usually several thousand, on the wafer, with only a single alignment step being needed for the bonding of the two substrates thereby reducing the production costs of the present optical connection considerably. Due to the photo-lithographic structuring process, the structures on the second substrate possess the same precision as the optoelectronic components on the first substrate, respectively wafer. Coupling of the single fibers to the optoelectronic components does not require micropositioning in the final completion. Furthermore, the overall construction of the connection is extremely flat as beam deflection is already integrated. The features of the present method and device in conjunction with alignment of the wafer plane permit cost-effective mass production of an optical fiber coupling.

In the present method and in the present device, the deflection element is preferably carried out as a reflecting structure. For a 90° deflection, the deflection area of the structure has to run at an angle of 45° to the surface of the second substrate. The deflection area may be plane or even curved in order, in the latter case, to obtain additional beam formation, in particular focusing. The reflecting structure may, for example, be a prismatic structure, in which the deflection of the light beam is achieved by means of interior reflection at a boundary area of the prismatic structure.

In the preferred embodiment of the present method, a photoresist is applied to the second substrate as a transparent material and is photolithographically structured to form the lateral guide and the deflection element(s). The boundary area which runs obliquely to the surface and which acts as the reflection area is preferably formed by means of oblique exposure via an illumination mask placed on the layer. This photolithographic structuring, referring in the present application to exposure followed by etching, permits producing guides for the optical waveguides and the optical deflection elements in one production step. Additional alignment is not necessary. Furthermore, oblique exposure forms a boundary, which runs obliquely to the surface, of the reflecting structure for coupling light in, respectively out. The boundary forms a stop in the upper region for the optical waveguide, in particular the fibers. This stop formed by the projecting reflecting structure permits in conjugation with the lateral guides exact positioning of the fiber in all three degrees of translation freedom.

According to another exemplary embodiment, the present invention provides a device for establishing an optical connection between at least one optoelectronic component and at least one optical waveguide, with the optoelectronic component arranged in a first substrate and emitting or receiving optical radiation substantially perpendicular to a substrate surface of the first substrate, and with the at least one optical waveguide aligned with a first end substantially parallel to the substrate surface, said device comprising: a second substrate that is transparent for at least one wavelength range of the optical radiation, the second substrate having thereon a structure of a material that is transparent for said wavelength range, wherein the structure forms a lateral guide for the first end of the optical waveguide, and forms an optical deflection element for establishing an optical connection between the first end of the optical waveguide and the optoelectronic component through the second substrate.

The monolithically integrated coupling of the optical waveguide with lateral guide(s) and beam deflection and the respective method permit realizing a cost-effective self-aligning coupling of a glass fiber to a laser irradiating in a perpendicular direction, with simultaneous 90° deflection of the light beam. The mechanical buildup of the coupling preferably occurs with the aid of a special lithographic technique in photoresist. In this manner many thousand holding means, respectively lateral guides, and deflection means can be produced simultaneously with very precise structures on the transparent substrate, in particular a thin glass plate. The alignment process of the substrate in relation to the laser occurs for all lasers on one wafer with a single alignment step. This technology can be used in the same manner for optical connection on the detector side, i.e. for connecting the glass fiber to a receiver, for example a PIN diode.

The intermediate space between the optical waveguide, respectively the optical fiber and the deflection element may also be additionally filled with a filler material, which can, on the one hand, serve as additional fixation of the fibers and, on the other hand, if the refractive index of this filler material is suitably selected, as index matching of the fibers and the deflection element. For this purpose, a filler material is preferably selected with a refractive index that lies between the refractive index of the material of the transparent layer of the deflection element and the refractive index of the material of the glass fiber core.

BRIEF DESCRIPTION OF THE DRAWINGS

The present method and the device therefor are described in the following preferred embodiments with reference to the accompanying drawings without the intention of limiting the scope or spirit of the protection set forth in the claims.

DETAILED DESCRIPTION OF THE INVENTION

Figure 1:
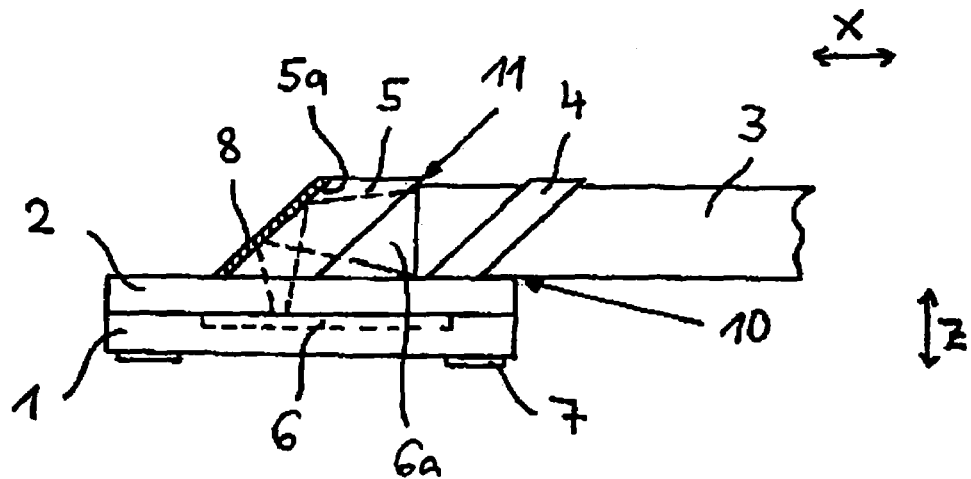
FIG. 1 shows in a principle sketch a lateral view of an optical connection produced using the method.

The following preferred embodiments describe the coupling of a glass fiber 3 to a VCSEL semiconductor laser 6, which has a vertical light emission. In order to keep the overall buildup flat, the laser beam emitted from the laser 6 must be deflected 90° into the fiber 3. For this purpose, a glass substrate 2 is provided on which a photoresist is applied thick enough to exceed the radius of the to-be-connected glass fiber. The photoresist is photolithographically structured on this carrier in such a manner that a guide structure 4 is formed to guide the glass fiber 3 laterally as well as a prismatic deflection element 5 for 90°-deflection. Utilized are conventional chip-making, photolithographic and mask aligning devices. The photoresist like the glass substrate 2 is transparent for the to-be-used optical wavelengths.

After photolithographic structuring of the photoresist on the glass substrate 2, the latter is joined with the substrate 1 in which the VCSEL semiconductor laser 6, in the present case a GaAs-VCSEL as bottom emitter is integrated. The VCSEL semiconductor laser 6 emits the laser radiation 6a perpendicular to the surface of the substrate 1 as shown in FIG. 1. The laser beam 6a is reflected at the 45° slanting prismatic structure 5 and enters the glass fiber 3 in this manner. In order to improve the degree of reflection, an additional gold reflecting coating 8 can be applied on the rear side of the reflection area 5a which acts as a boundary area of the prismatic structure 5.

The thickness of the glass substrate 2 can be selected in such a manner that the laser beam 6a does not widen towards the glass fiber 3 more than the diameter of its core. The glass substrate 2 simultaneously serves as a stabilizing carrier material for the thinned substrate 1 with the VCSEL semiconductor laser 6. As this laser is carried out as a bottom emitter, the electrical contact areas 7 are accessible on a CMOS trigger chip for direct assembly, for example by means of wafer bumping or contacting by means of conductive gluing.

The embodiment of the guide structure 4 and the prismatic structure 5 depicted in FIG. 1 permits exact positioning of the fiber 3 in all three translation directions. When inserting the fiber 3, the surface of the glass substrate 2 acts as a positioning stop 10 in Z-direction. The guide structure 4 running along both sides of the fibers forms the positioning stops 12 in Y-direction. The positioning stop 11 in X-direction is realized by the upper region of the prismatic structure 5 which is simultaneously a second stop in Z-direction.

Figure 5:
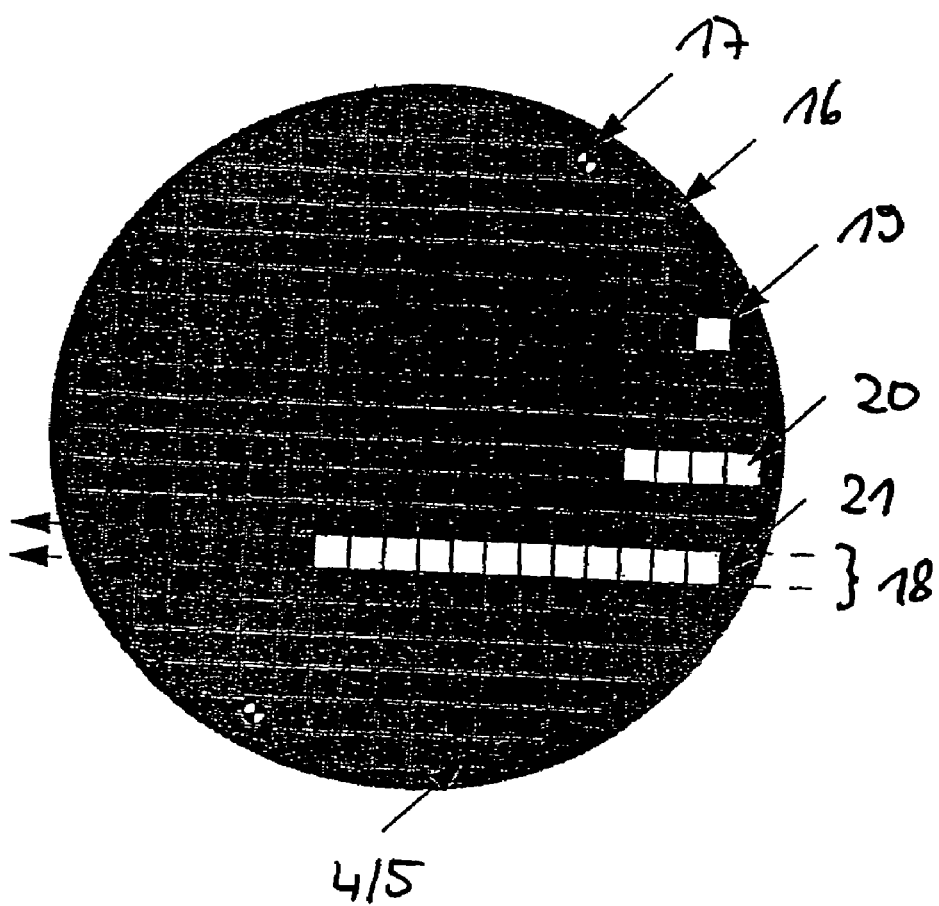
FIG. 5 shows an example of a raster-shaped arrangement of a multiplicity of deflection and guide structures according to the present method on a glass substrate.

The present method offers special advantages in simultaneously coupling a multiplicity of fibers 3 to just as many lasers 6 produced on one wafer. As the deflection and guide structures 4,5 are produced photolithographically in the same raster as the lasers 6, they are of the same precision as the semiconductor lasers 6 on the wafer. FIG. 5 shows a top view of such a type glass substrate 16 whose dimensions have been matched to a wafer and on which the wafer cutting lines 18 for subsequent division in single chips are indicated. Located on each area bordered by the cutting lines are the guide structures 4 and the prismatic structure 5, as indicated in the lower part using one area as an example. Following the production of this glass substrate 16 with the respective structures, the glass substrate 16 and the wafer with the semiconductor lasers 6 are aligned with a very precise wafer alignment in such a manner that subsequently all the structures are aligned in the same manner to each other. The alignment markings 17 employed therefor are shown in FIG. 5. Gluing the glass substrate 16 to the wafer ensures positioning.

Subsequent division of the composite in entities of single lasers 6 or of certain groups of lasers with the glass substrate comprising the guiding, respectively holding, structure 4 for the fibers 3 placed on the rear side thereof yields finished useable composite components comprising a VCSEL semiconductor laser 6 with a bottom emitter, the radiation deflector 5 and the guide structure 4 with a stop for the fibers 3. Such a type single structure 19 is indicated in FIG. 5. Similarly, four (reference number 20) or twelve (reference number 21) connecting composite components, on which the single structures are spaced precisely apart, can be sawed. The interspace can, for example, correspond to the normal interspace apart of 250 μm. However, smaller or greater distances can, of course, also be realized.

Figure 2:
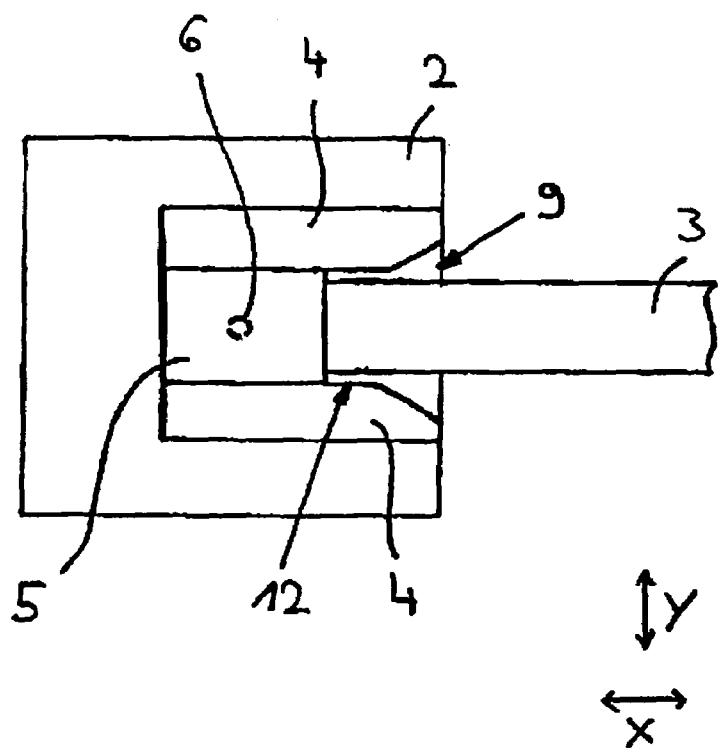
FIG. 2 shows a top view of the example of FIG. 1.

Finally, FIG. 2 shows another top view of a device according to the present invention connected to the substrate 1, as is also shown in a lateral view in FIG. 1. In the top view, there is a funnel-shaped aperture 9 in the guide structure 4, which simplifies introducing the fiber 3 for positioning and holding. The guide structure 4 on both sides of the fiber forms the positioning stop 12 in Y-direction shown in FIG. 1.

Figure 3:
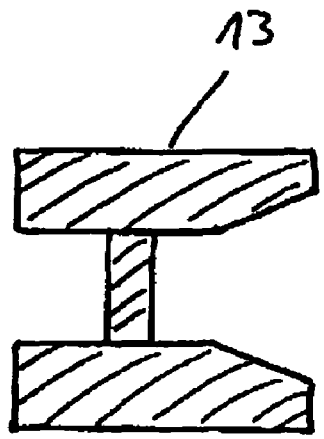
FIG. 3 shows an example of an oblique exposure mask for conducting the method.

In order to produce the prismatic structure 5 shown in FIG. 1 slanting 45° as indicated, the respective exposure masks are exposed obliquely. FIG. 3 shows a first example of such a type oblique exposure mask 13, which can be used to produce the structure for connecting to an optical emitter, for example a VCSEL semiconductor laser 6. This oblique exposure mask 13 does not only determine the prismatic structure 5 but also defines the lateral guide structures 4 with the funnel-shaped aperture visible on the mask.

Figure 4:
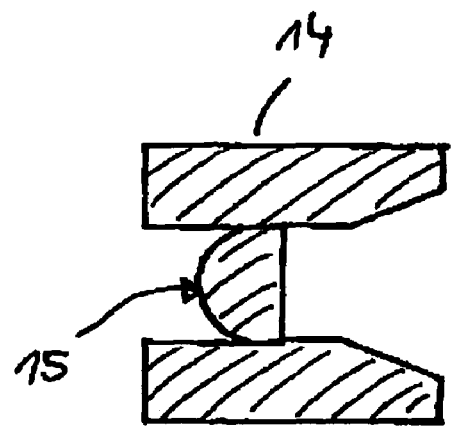
FIG. 4 shows another example of an oblique exposure mask for conducting the method.

The description for the preceding examples also applies to coupling the fiber 3 to an optoelectronic receiver, for example a PIN diode, only that the PIN diode replaces the laser 6. In this case, the reflection area 5a acting as the boundary area of the prismatic structure can be provided with a convex curvature by means of which the light coming from the fiber 3 is additionally focused onto the receiver. FIG. 4 shows an example of an oblique exposure mask 14 for creating such a convex reflection area. The convexity 15 is predetermined by the structure of the mask. This structure creates a convex curvature of the reflection area, which has the effect of a cylindrical lens. This focusing by means of a cylindrical lens can also be supplemented by an additional lens integrated in the glass substrate.

Figure 6:
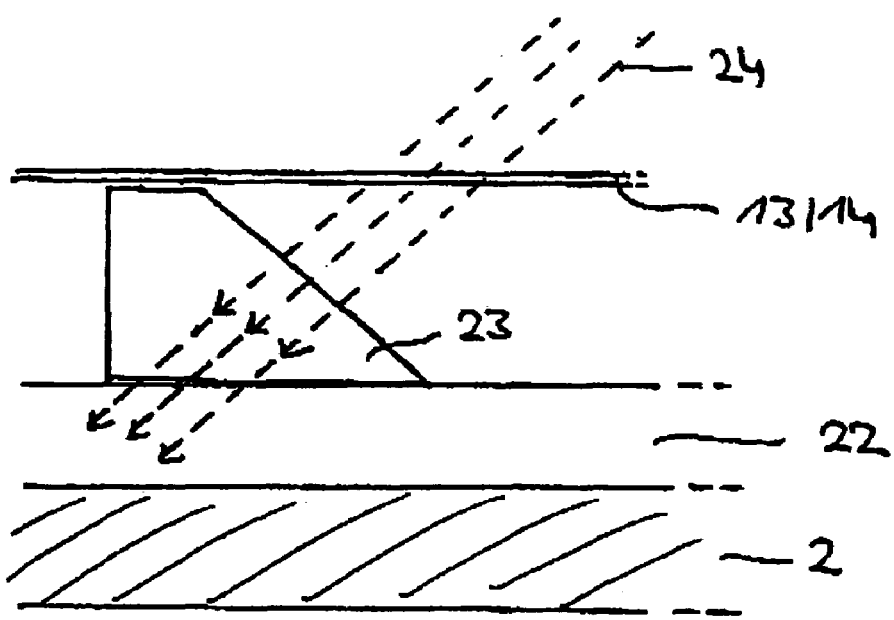
FIG. 6 shows an example of conducting the exposure step.

In order to produce a prismatic structure 5 with an angle of 45° of at least one boundary area to the surface of the glass substrate, it may be necessary to reduce the refraction of the light employed to expose the photoresist when entering the photoresist. For this purpose, in one embodiment of the present method a prism 23 is placed on the photoresist 22, which has a similar refraction index as the photoresist. By means of suited prism angles, almost straight passage of the oblique incident exposure beam 24 through the prism 23 and the photoresist 22 can be achieved, as shown schematically in FIG. 6.

Furthermore, the exposure mask 13/14 can be structured with additional apertures in order to obtain lines of constant intensity in the photoresist during exposure and in this manner uniform exposure independent of scattering effects. The corresponding structuring of the mask can be calculated in advance on the basis of a computer simulation.

In addition, the intermediate space between the end of the glass fiber 3 and the prismatic structure 5 can be filled with a transparent material in order, on the one hand, to fix the fiber better and, on the other hand to match the indices of the fiber material and of the material of the prismatic structure. Used is preferably a polymer whose refractive index lies between that of the material of the fiber core, for example $SiO_2$ with a refractive index of 1.47 and that of the material of the photoresist, for example with a refractive index of 1.6.

In this example, a polymer with a refractive index of 1.6 can be employed. In the present method, suited as photoresist is, for example, the prior art type SU-8, which can be applied sufficiently thick on the glass substrate and structured.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for establishing an optical connection between at least one optoelectronic component arranged in a first substrate and emitting or receiving optical radiation substantially perpendicular to a substrate surface of the first substrate, and at least one optical waveguide aligned with a first end substantially parallel to the substrate surface, said method comprising:
   providing a second substrate that is transparent for at least one wavelength range of the optical radiation;
   applying a layer of material on said second substrate, said layer being transparent, at least after structuring, for said wavelength range;
   structuring said layer of material in such a manner that the structured material forms both a lateral guide for the first end of the optical waveguide and an optical deflection element establishing an optical connection through the second substrate between the optoelectronic component and the first end of the optical waveguide; and
   joining the second substrate to the first substrate.

2. The method according to claim 1, wherein the optical deflection element is a reflecting structure.

3. The method according to claim 1, wherein the at least one optical waveguide is an optical fiber.

4. The method according to claim 2, wherein said layer is a photoresist material, and is structured photolithographically.

5. The method according to claim 4, wherein the optical deflection element has a boundary area acting as a reflection area, and the boundary area is formed by oblique exposure of an exposure mask placed over the layer.

6. The method according to claim 4, wherein the entire photolithographic structuring of the photoresist material occurs by means of oblique exposure of an exposure mask placed over the layer.

7. The method according to claim 5, wherein the at least one optoelectronic component comprises a multiplicity of optoelectronic components disposed in a raster pattern on the first substrate, and the method further comprises forming lateral guides and optical deflection elements in the raster pattern on the second substrate, joining the first and second substrates to form a composite substrate, and dividing the composite substrate into single composite units comprising one or more optoelectronic components.

8. The method according to claim 1, wherein the at least one optoelectronic component comprises a multiplicity of optoelectronic components disposed in a raster pattern on the first substrate, and the method further comprises forming lateral guides and optical deflection elements in the raster pattern on the second substrate, joining the first and second substrates to form a composite substrate, and dividing the composite substrate into single composite units comprising one or more optoelectronic components.

9. The method according to claim 1, wherein the second substrate is a glass substrate.

10. The method according to claim 1, wherein the first substrate and the second substrate are glued together.

11. The method according to claim 1, wherein the optical deflection element has a boundary area that acts as a reflecting area, and the boundary area is metallically coated.

12. The method according to claim 1, wherein the optical deflection element has a boundary area that acts as a reflecting area, and the boundary area is convex to focus the optical radiation.

13. The method according to claim 1, wherein an intermediate space exists between the optical deflection element and the first end of the optical waveguide, and the intermediate space is filled with a filler material that is transparent for said wavelength range of the optical radiation.

14. The method according to claim 13, wherein the filler material has a refractive index that lies between a refractive index of the optical waveguide and a refractive index of the structured layer.

15. A device for establishing an optical connection between at least one optoelectronic component and at least one optical waveguide, with the optoelectronic component arranged in a first substrate and emitting or receiving optical radiation substantially perpendicular to a substrate surface of the first substrate, and with the at least one optical waveguide aligned with a first end substantially parallel to the substrate surface, said device comprising:
   a second substrate that is transparent for at least one wavelength range of the optical radiation, the second substrate having thereon a structure of a material that is transparent for said wavelength range, wherein the structure forms a lateral guide for the first end of the optical waveguide, and forms an optical deflection element for establishing an optical connection between the first end of the optical wave guide and the optoelectronic component through the second substrate.

16. The device according to claim 15, wherein the optical deflection element is a reflecting structure.

17. The device according to claim 15, wherein the lateral guide and the optical deflection element are made of a structured photoresist material.

18. The device according to claim 15, wherein the second substrate includes a plurality of lateral guides and optical deflection elements disposed in a raster pattern.

19. The device according to claim 15, wherein the second substrate is a glass substrate.

20. The device according to claim 15, wherein the optical deflection element has a boundary area that acts as a reflection area, and the boundary area is metallically coated.

21. The device according to claim 15, wherein the optical deflection element has a boundary area that acts as a reflection area, and the boundary area is convex to focus the optical radiation.

22. The device according to claim 15, wherein the lateral guide and the optical deflection element are made of a structured photoresist material, and the second substrate includes a plurality of lateral guides and optical deflection elements disposed in a raster pattern.

23. The device according to claim 15, wherein the at least one optical waveguide is an optical fiber.

* * * * *